Patented Feb. 3, 1925.

1,525,042

UNITED STATES PATENT OFFICE.

CHARLES E. PARSONS, OF NEW YORK, N. Y., AND SAMUEL PEACOCK, OF WHEELING, WEST VIRGINIA, ASSIGNORS TO METAL RESEARCH CORPORATION, OF NEW YORK, N. Y., A CORPORATION OF DELAWARE.

PROCESS OF MAKING ALUMINUM CHLORIDE.

No Drawing. Original application filed March 29, 1924, Serial No. 702,963. Divided and this application filed June 27, 1924. Serial No. 722,668.

*To all whom it may concern:*

Be it known that we, CHARLES E. PARSONS, a citizen of the United States, residing at New York, in the county of New York and State of New York, and SAMUEL PEACOCK, a citizen of the United States, residing at Wheeling, in the county of Ohio and State of West Virginia, have invented certain new and useful Improvements in Processes of Making Aluminum Chloride; and we do hereby declare the following to be a full, clear, and exact description of the invention, such as will enable others skilled in the art to which it appertains to make and use the same.

This invention relates to a process of making aluminum chloride, $Al_2Cl_6$ and has for its object to improve the procedures heretofore proposed.

With these and other objects in view the invention consists in the novel steps and combinations of steps constituting the process all as will be more fully hereinafter disclosed and particularly pointed out in the claims.

This application is a division of our original copending application, Serial Number 702,963, filed March 29, 1924, process of making aluminum chloride.

In carrying out this invention anhydrous aluminum chloride is produced by re-acting upon alumina with carbonyl chloride, $COCl_2$ or by the action of said carbonyl chloride on slag, an aluminum salt, or a suitable mineral.

The temperature of a commercial reaction velocity is a minimum at about 400° C. and as anhydrous aluminum chloride $Al_2Cl_6$ is volatile at 200° C., a separation is effected by the customary sublimation method.

In order that the invention may be the more clearly understood it is said: Carbonyl chloride $COCl_2$ may be produced as set forth in our original application above mentioned, by the interaction of sodium chloride NaCl usually called "common salt" and carbon monoxide, CO. Any alkali metal or alkaline-earth-metal chloride is also effectual. At about 1400° C. common salt when in contact with carbon and in the presence of carbon monoxide, CO, and in the absence of any oxidizing reagent, forms carbonyl chloride and sodium oxide. As a beginning and ending equation, the reaction may be stated thus:—

Sodium oxide cannot exist as such under the conditions, as a reduction would take place thus:

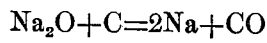

Upon cooling, however, this latter reaction would reverse, the equilibrium being a function of the temperature and concentration in the gas phase. Carbonyl chloride $COCl_2$ is completely dissociated at 900° C. and moves up the shaft as carbon monoxide and free chlorine. Upon cooling to 800° C. and less, the carbonyl chloride reforms in the presence of coke.

It is proposed, in this invention, to make carbonyl chloride in a shaft furnace and under the customary operating restrictions of an iron producing blast furnace. If common salt were used, it would melt at about 800° C. and sublime freely at 1100° C. Common salt in vapor form, at about 1400° C. in contact with coke and carbon monixide CO at the same temperature, will react to produce free chlorine and sodium oxide. More or less of the sodium oxide $Na_2O$ thus produced will be reduced to elemental sodium which is volatile at about 900° C. and will rise with the reaction gases, and upon cooling will react with carbon monoxide CO to form sodium oxide, thus:—

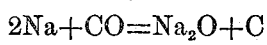

And, sodium oxide $Na_2O$ thus formed would condense in the relatively cool furnace charge, and in contact with carbonyl chloride at about 700° C., would reform common salt, thus:—

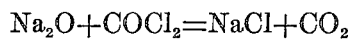

At the temperature, however, and in the presence of silica, sodium silicate would form, and being very fluid when molten, would quickly drop to the furnace hearth and escape any considerable contact with reducing gases.

As an industrial operation, when common salt is used it must always be present in excess of the proportions indicated by the reaction as pointed out in our said original application, and more or less of the same will be vaporized as such; and, escaping contact with carbon, will rise in the furnace to a point of condensing temperature about 800° C., or 1475° F. The condensed common salt then moves down with the furnace charge, and is again vaporized, until, with a suitable number of such returns, the vapor space of the high temperature zone of the furnace becomes stable at such high partial pressure of the vapor of sodium chloride, that no more is vaporized as such, except to replace the salt converted to carbonyl chloride and free chlorine.

There is also another well known major reaction in the interaction of carbon and common salt, at high temperatures, in the presence of nitrogen. That is, in a blast furnace the gases of the high temperature zone contain neither oxygen nor carbon dioxide, and are rich in nitrogen. Common salt vapor in contact with white hot carbon and in the presence of nitrogen, at about 1400° C., reacts to form sodium cyanamid and chlorine, thus:—

$$2NaCl + C + N_2 = Na_2CN_2 + Cl_2$$

The sodium cyanamid is volatile at its temperature of formation, and rises with the reaction and combustion gases until cooled to about 700° C. when the free chlorine reacts with carbon monoxide which is always present in excess due to the combustion of carbon at the tuyères, and carbonyl chloride $COCl_2$ is formed. The sodium cyanamid is destroyed by carbonyl chloride, thus:—

$$Na_2CN_2 + COCl_2 = 2NaCl + CO + C + N_2$$

The recreated common salt NaCl condenses on the relatively cool charge and moves down the furnace shaft with it until the high temperature zone is reached, when the operation is repeated.

Therefore in general when common salt is used, the process consists in the decomposition of said salt by means of a carbon combustion and contact with white hot coke, and cooling the chlorine thus liberated, to about 700° C. in contact with carbon monoxide CO in a strongly reducing atmosphere. Carbonyl chloride $COCl_2$ forms, and in contact with alumina at temperatures between 400° C. and 700° C. reacts as follows:—

$$Al_2O_3 + 3COCl_2 = Al_2Cl_6 + 3CO_2$$

The aluminum chloride $Al_2Cl_6$ being volatile at 200° C. passes out of the furnace in the exit gases. The sodium of the common salt, in the presence of silica, ultimates as silicate of sodium and leaves the furnace as molten slag.

It is obvious, however, that other chlorides may be substituted for common salt, notably calcium chloride $CaCl_2$. In this case the reactions would be much the same as if common salt were employed, except that no reduction of calcium oxide would occur, and calcium silicate would ultimate as molten slag. The furnace atmosphere would contain no vaporized chloride, and the physics of the operation would be somewhat simplified; but the end product of carbonyl chloride would remain the same.

In practical operation this invention is carried out as follows: A furnace of the blast furnace type is charged through a suitable "bell" with coke, calcium chloride and an alumina containing substance such as alumina, bauxite, clay, slag, etc. More or less iron oxide is likely to be present in crude minerals or slags. As the charge sinks in the furnace and a suitable temperature is reached, the carbonyl chloride converts the alumina and ferric oxide $Fe_2O_3$ present to volatile anhydrous chlorides such as $Al_2Cl_6$ and $Fe_2Cl_6$ which being volatile at 200° C., pass out of the furnace at the gas exit and are suitably collected. The remaining components of the furnace charge, excepting the coke, pass out of the furnace as a molten slag, and may be employed in glass manufacture. To illustrate the effect with the employment of kaolin, the following equation shows the trend of the operation:

(1) $\underset{\text{(Solid)}}{Al_2Si_2O_7} + \underset{\text{(Gas)}}{3COCl_2} = \underset{\text{(Gas)}}{Al_2Cl_6} + \underset{\text{(Gas)}}{3CO_2} + \underset{\text{(Solid)}}{SiO_2}$ It will now be clear that by the action of carbonyl chloride on aluminum, free of combined as a silicate, one is enabled to make aluminum chloride $Al_2Cl_6$ in a furnace of the blast type. Said chloride being volatile at the temperature of its production, it passes out of the top of said furnace, but is collected along with the combustion gases, and is separated therefrom by any suitable and well known means.

What is claimed is:—

1. The process of making anhydrous aluminum chloride in a blast furnace which consists in providing a furnace charge containing carbon, calcium chloride and aluminum in a combined state; raising a portion of said charge to a temperature of substantially 1400° C. to cause the combined chloride present to form carbonyl chloride; and causing said carbonyl chloride to react with said combined aluminum present to form the desired aluminum chloride.

2. The process of making anhydrous aluminum chloride in a blast furnace which consists in providing a furnace charge containing carbon, calcium chloride and aluminum in a combined state; raising a portion of said charge to a temperature of substantially 1400° C. to cause the combined chlorine present to form carbonyl chloride; and causing at a temperature between 500° C. and 700° C. said carbonyl chloride to react with said combined aluminum present to form the desired aluminum chloride.

In testimony whereof we affix our signatures.

CHARLES E. PARSONS.
SAMUEL PEACOCK.